Dec. 12, 1967   J. A. GATLEY ETAL   3,357,893
VENTED NUCLEAR REACTOR FUEL ELEMENT
Filed Aug. 23, 1965   3 Sheets-Sheet 3
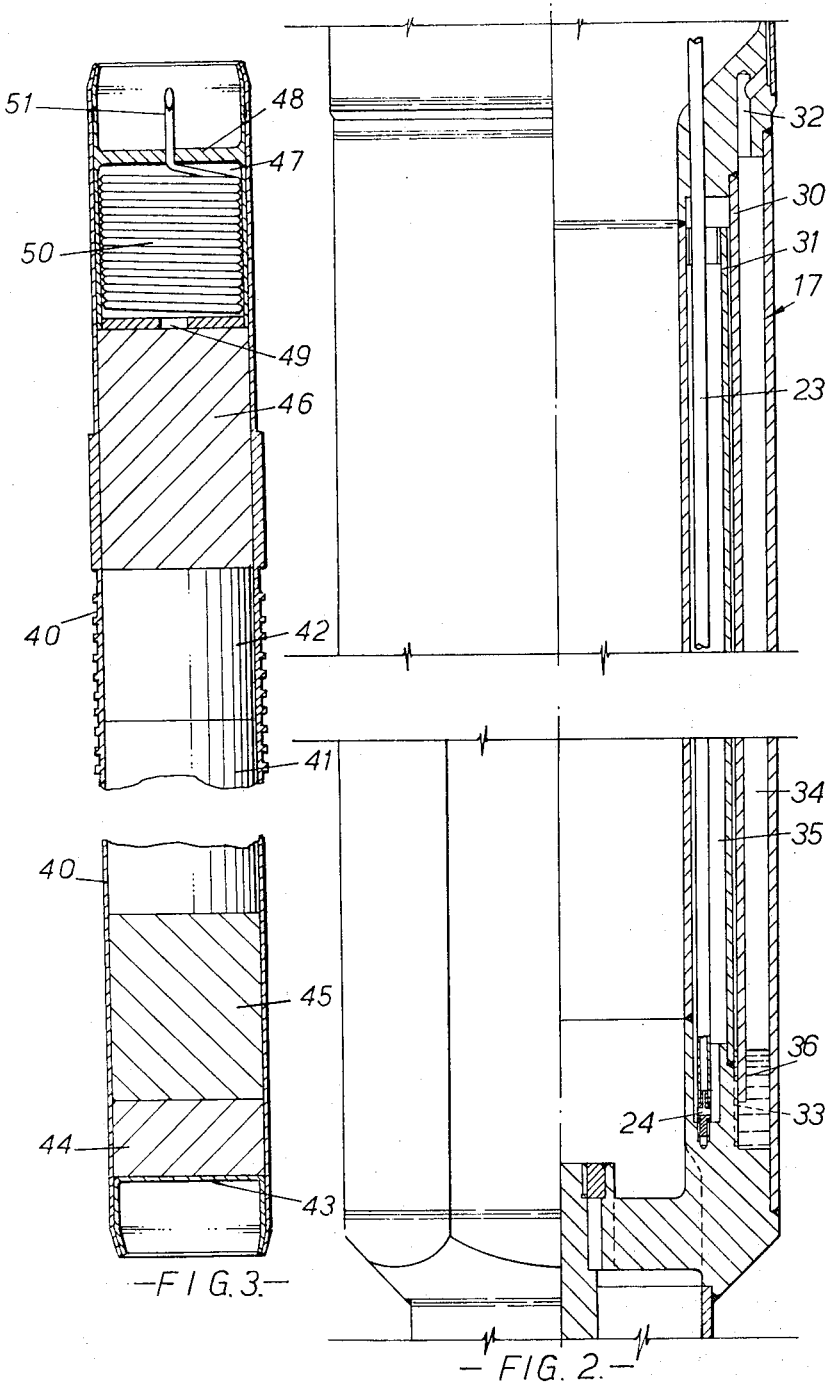

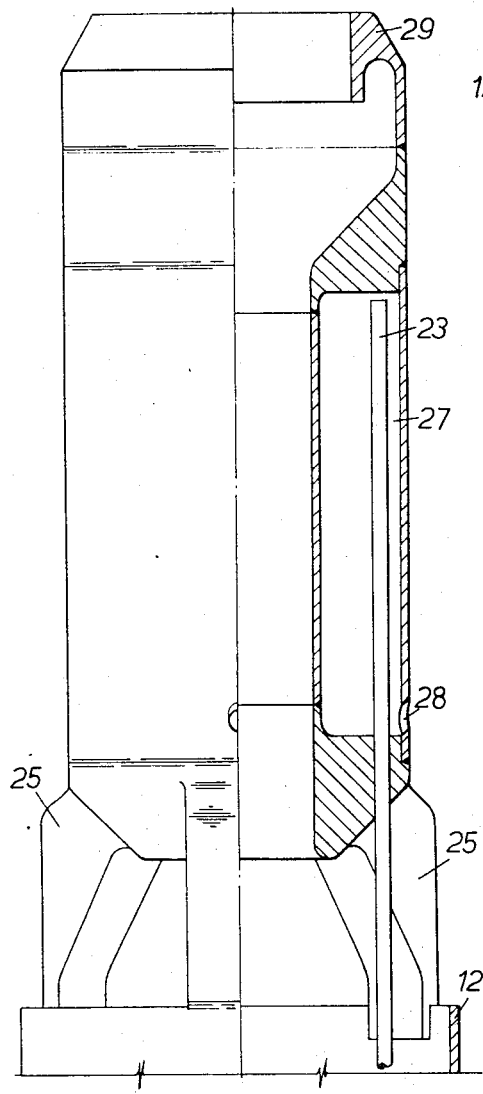
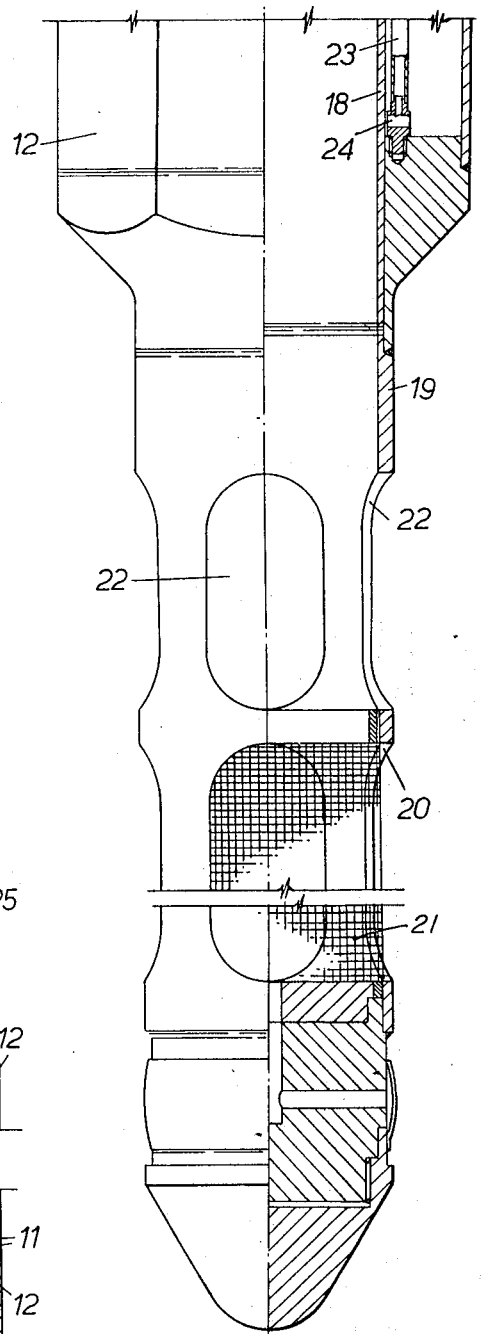
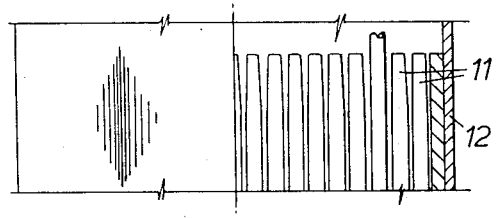

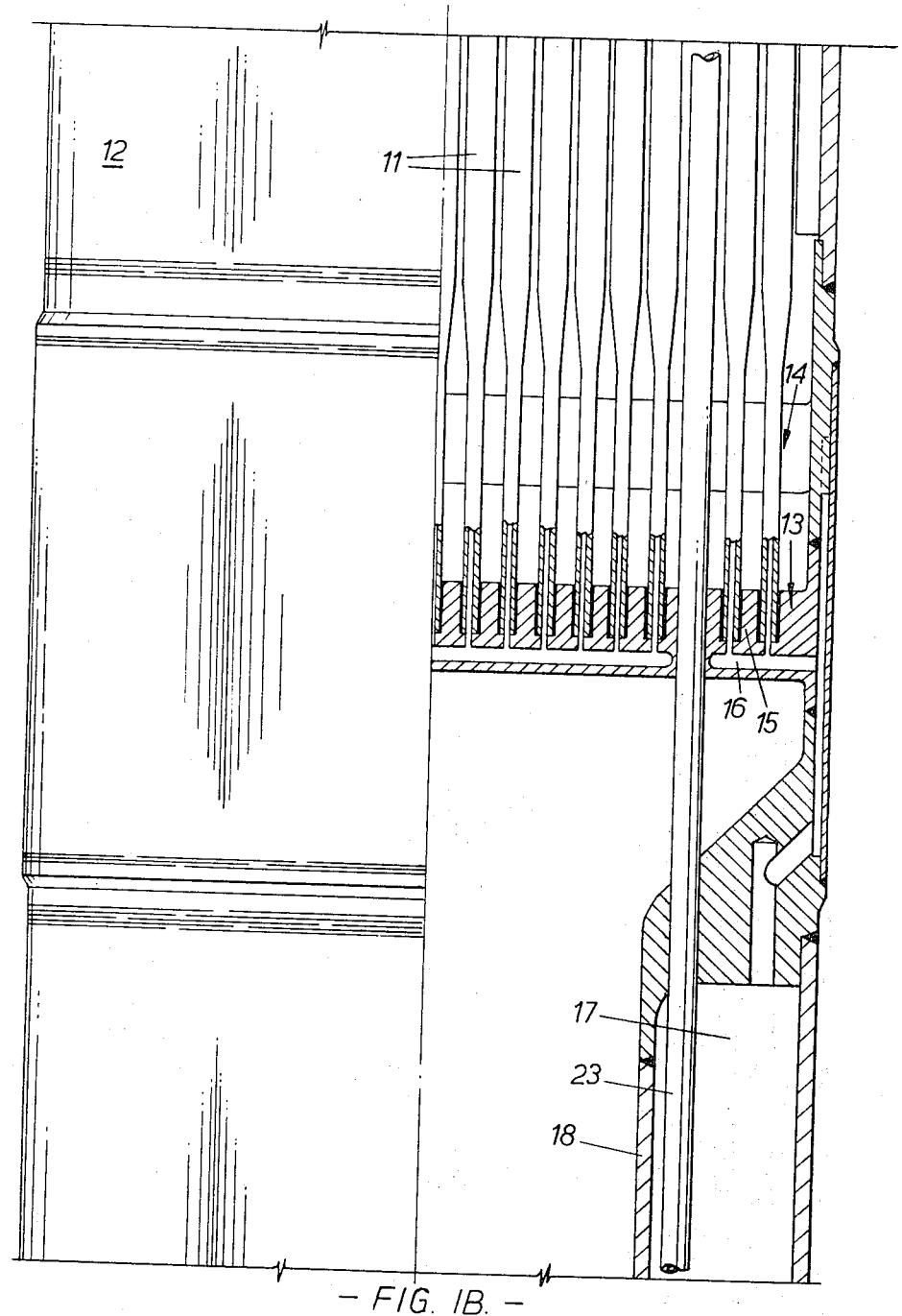
- FIG. 1B. -

United States Patent Office 3,357,893
Patented Dec. 12, 1967

3,357,893
VENTED NUCLEAR REACTOR FUEL ELEMENT
John Andrew Gatley, Appleton, John Webb, Bryn, and Reginald Robert Gallie, Seascale, England, assignors to United Kingdom Atomic Energy Authority, London, England
Filed Aug. 23, 1965, Ser. No. 481,815
Claims priority, application Great Britain, Aug. 28, 1964, 35,424/64
12 Claims. (Cl. 176—68)

The present invention relates to nuclear reactor fuel elements and is concerned in particular with so-called vented fuel elements, these being elements which have protecting sheaths so adapted that gases released by the fuel content during operation of the reactor are allowed to escape along a vent path to the immediate surroundings, that is to say in general terms, the interior of a vessel enclosing the core in which the fuel elements are included. Vented fuel elements in the present context are therefore to be distinguished from the kind of fuel element in which the fission product gases, or purge gas streams for scavanging these gases, are drawn off, separately from the core coolant, through piping leading to a decontamination plant.

Vented fuel elements as previously referred to have the advantage that, with gas releasing types of fuel, such as fissile oxides operated at high temperatures, the limitation on the irradiation life of the element due to pressure stressing of the sheath is virtually eliminated. A disadvantage, however, is that fission products from the fuel can be carried over into the core coolant and the coolant circuit can therefore become highly active. An object of the invention is to reduce this disadvantage.

According to the present invention, a vented fuel element in or for a nuclear reactor has its vent path of extended length for promoting by delay the decay of short-lived gaseous phase fission products before escape. In general the delay reduces the equilibrium radioactivity level of the system external to the fuel elements. More specifically, some of the short-lived gaseous phase products may decay during this delay time either to unstable daughter products which are solid or to daughter products which, although still of gaseous phase, are stable or at least do not pose any serious system shielding problems. An example of the solid daughter products case is $^{88}$Kr which decays with a half-life of 2.8 hours to $^{88}$Rb having a high energy gamma activity. An example of the second case is the 132 decay chain where $^{132}$Te decays with a half-life of 78 hours to $^{132}$I and this in turn decays with a half-life of 2.3 hours to the stable $^{132}$Xe. In both cases the external system is saved from radioactivity contamination, either because the product is retained or because what does escape is stable. Retention of solid products is by deposition on internal surfaces and such retention can therefore be expected of any type of element where the fuel is substantially enclosed by sheathing.

Long transit times in the vent path may be used, particularly with a view to reducing the release of radioactive iodine isotopes; these are assumed to be in the gaseous phase and those of main concern have half-lives running into days. Although decay takes place to xenon isotopes which will find their way to the coolant, many of them are stable and therefore unobjectionable on activity grounds. The extended length vent path may afford unrestricted passage for flow. The mean time of transit (herein meaning the free volume of the vent path divided by the gas release rate) should be many hours; not less than 100 hours may be quoted, or even 150 hours. Such figures are to some extent arbitrary and do not account for gaseous diffusion processes by which the progression of the various gaseous phase components to the outlet of the vent path may be faster and to some extent non-uniform; nevertheless they serve to illustrate the width of the difference which may exist between elements in accordance with the invention and prior constructions which do not have the same objective. In one embodiment of the invention, a vented fuel element has an elongated protective sheath which is provided at one end with a connection placing the sheath interior, and hence fuel therein, in communication with a vent tube, this tube being at least as long as the sheath, possibly with its outlet adjacent the other end of the sheath.

An alternative is to provide an extended length vent path which by being restrictive is adapted to act in effect as a diffusion retarder. By this means rather less volume is necessary in the vent path than in the case where the flow is virtually unrestricted. A length of capillary tube is suitable.

In conjunction with such vent paths as have been previously referred to there may be included any one of a variety of filter means. Such filter means may be chosen for absorbing certain of the fission products; for example a filter means with a graphite constituent will contribute to reducing the release of iodine isotopes. Filter means in the nature of liquid scrubbers may also be employed. Interposed liquid traps also act as gaseous diffusion barriers.

By way of example, specific embodiments of the invention are illustrated in the accompanying drawings in which:

FIGURES 1A, 1B and 1C show respectively in part longitudinal section the upper, middle and lower portions of a first embodiment applicable to a fast reactor, cooled by liquid metal, FIGURE 1B being to a larger scale, FIGURE 2 shows in part longitudinal section a relevant portion of a second embodiment for the same application, and FIGURE 3 shows in longitudinal section a third embodiment applicable to a gas-cooled thermal reactor.

In the first embodiment, fuel elements in the form of long pins 11 are grouped in parallel relationship on a triangular lattice into an assembly including an elongated open-ended hexagonal casing or wrapper 12. Each fuel pin is to be understood to have a thin cylindrical sheath enclosing nuclear fuel material which in the present case is of mixed uranium and plutonium dioxides. Consistent with the intended use in liquid metal coolant the fuel pin sheathing is of stainless steel.

At least one spacer grid (not appearing in the drawings) locates the fuel pins in the wrapper 12 and, for support, lower open ends of these pins are brazed into a dual purpose structure (FIGURE 1B) installed towards the lower end of the wrapper. This structure comprises two superposed gratings 13 and 14 each of which is bounded by a hexagonal casing section. Such section is, at least for part of its length, of slightly smaller dimensions than the wrapper hexagon and extending across the inside of the section in parallel relationship and at a pitch equal to the distance between alternate rows of the fuel pins, are grating bars such as 15, which are wide enough on the one hand to receive the necked lower ends of the fuel pins brazed therein, and narrow enough on the other hand for the coolant flow to pass between them without undue pressure drop. The positioning of the grating bars is such that the bars of the one grating are between those of the other so that one set of alternate rows of pins are brazed ino one of the gratings while the other set are brazed into the other. Passing through each of the grating bars is a bore or passage 16 which connects in common to passages around the grating all the holes in which the fuel pins are brazed; therefore not only do the gratings fulfill the function of supporting the fuel pins but they serve also to interconnect the interiors of the fuel pins in rows to a collector chamber 17 which is now to be described.

This collector chamber 17 is defined over a lower length of the fuel element assembly between the hexagonal wrapper and a cylindrical sleeve 18 extending co-axially inside the wrapper. At the bottom of the collector chamber the wrapper is extended by a hollow locating spike 19 having cylindrical shape corresponding to that of the sleeve 18. This spike has slotted openings 20 for the entry of inlet coolant into the hollow interior, these openings being covered by a filter sleeve 21 of wire gauze disposed inside the spike. Another set of slotted openings 22 in the spike allow coolant entry from adjoining assemblies in the event of a filter blockage. The inlet coolant proceeds from the hollow interior of the spike 19 through the sleeve 18 to the wrapper and inside the wrapper flows upwardly over the fuel pins.

Extending inside the collector chamber 17 to the base thereof is a vent tube 23 which passes upwardly through the grating 13 to occupy one position of the fuel pin lattice, this vent tube being of the same external diameter as the pins. As seen in FIGURE 1B the grating 13 which would otherwise accommodate a fuel pin in the position occupied by the vent tube has the passage 16 blocked off to either side of the vent tube; instead the vent tube has communication with the collector chamber only at its bottom extremity where there is provided a cross bore 24.

Above the fuel pin lattice the vent tube continues into an upper fixture of the fuel element assembly. This fixture is joined to the wrapper 12 by legs 25 leaving space for discharge of outlet coolant from the upper end of the wrapper. The fixture is of a hollow annular shape to define a liquid sealed gas trap chamber 27 into which the vent tube 23 penetrates. The lower end of this chamber has communication with the exterior through several holes 28. The top extremity 29 of the fixture is formed as a lifting head.

On charging of the assembly into the reactor core the coolant, being under pressure to some extent in the region of the top fixture, will enter through the holes 28 into the gas trap chamber 27 and if the initial gas content of the assembly remains cool compression of such gas allows the entering coolant to reach the collector chamber 17 and form therein a free surface. When the initial gas content is raised in temperature corresponding to on-load operation of the assembly, the expansion of the gas expels coolant from the vent tube 23 and the gas trap chamber. Thereafter, gas liberated by the fuel material during operation finds its way through the passages of the gratings 13 and 14 to the collection chamber 17 and from there can ultimately escape to the surrounding coolant through the vent tube and the gas trap chamber.

The chief difference in the second embodiment of FIGURE 2 lies in the construction of the collector chamber 17, this being the portion appearing in FIGURE 2; the vent tube 23 remains unchanged, as is also the case for the interconnection of the fuel pin interiors with the collector chamber through the gratings 13 and 14. Outer and inner cylindrical sleeves, 30 and 31 respectively, having a small clearance between them are disposed in the collector chamber 17 to form a labyrinth between the gas entry bore 32 and the cross bore 24 in the vent tube, the arrangement of the sleeves being such that the lower end of the outer sleeve 30 allows access to the clearance through several grooves 33 and the upper end of the inner sleeve allows access to the clearance by terminating in a free end. The sleeves divide the collector chamber into a delay space 34 and a buffer volume 35, the path to the vent tube therefore being down the delay space, up the clearance between the sleeves and down the buffer volume.

In the vent path there is provided a scrubber means effective for arresting some of the products arising in the gas liberated from the fuel material. As illustrated this scrubber means is constituted by a pool of sodium 36 introduced into the bottom of the delay space to immerse the lower end of the outer sleeve 30 and so form a dip seal or lute. This sodium pool is effective to retain any caesium occurring as a decay product in the gases. Other scrubber liquids may be used to arrest a wider range of products.

The buffer volume 35 is so dimensioned that contraction of the gas content of the fuel element assembly when the reactor core is allowed to cool on shut down does not bring induced coolant to a level above the upper end of the inner sleeve 31. The scrubber sodium 36 is therefore always isolated from the coolant and the possibility of caesium arrested therein being carried out of the assembly on resuming operation of the reactor is therefore avoided. In both the above-described embodiments the mean transit time is in excess of 100 hours.

In the third embodiment of FIGURE 3, a fuel element, again in the form of a long pin, has a thin cylindrical sheath of stainless steel 40 enclosing stacked pellets 41, 42 of slightly enriched uranium dioxide. Elements of this kind are grouped in parallel relationship in a cluster carried within an open-ended sleeve of graphite (not shown).

At the lower end of the element as seen in the drawing a recessed end cap 43 is separated from the pellet stack by two alumina thermal insulating discs 44, 45. As the upper end, there is only one alumina insulating disc 46 and in place of the second disc there is a chamber 47 formed as an extension of the end cap 48, this chamber having open communication with the fuel-containing space through a hole 49.

Within the chamber 47 there is a length of capillary tube longer than the overall length of the fuel element and coiled helically to form a closed turn coil 50. One open end 51 of the tube projects externally of the fuel element and is sealed by brazing in passage through the end cap; the other end of the tube which is also open, but not seen in the drawing, is inside the chamber 47. Thus, the only way by which gases released from the fuel pellets may pass to the exterior of the fuel elements is along the extended length restricted vent path represented by the capillary tube coil 50.

By coiling the tube, or otherwise forming it into a bundle of closely packed turns, the requisite long length can be made compact; so that this can be fully appreciated, appropriate dimensions which will indicate the scale of FIGURE 3 are as follows: the fuel pellets have a diameter of about 1.5 cm. and the coil 50 is 160 cm. of capillary tube having a bore diameter of 0.495 mm. Many other arrangements of the vent tube lie within the scope of the invention; instead of being outside the fuel-containing space, as in the illustrated embodiments, the tube may be disposed at least in part inside the space. For example, the tube could extend along the fuel axis, like a spine, from one end of the fuel-containing space to the other and be open to this space at one end and open to the exterior of the fuel element at the other.

The length and other dimensions of the vent path are a matter for calculation and/or experiment depending on the circumstances of the particular reactor design concerned. Notable relevant circumstances are the rate of release of fission products from the fuel, the fuel operating temperature and the maximum radioactivity limit desirable in the system external to the fuel elements.

What we claim is:

1. For a nuclear reactor, a fuel element of the vented type having a fuel-containing protective sheath of elongated form and comprising means defining a vent path unobstructed by fuel and having permanently open communication with the fuel adjacent one end, the other end of the vent path being an outlet in open communication with the exterior surroundings of the sheath for discharge into these surroundings of gases released by the fuel during operation of the element and the length of the vent path between said one end and the outlet being longer than the fuelled length of the sheath in order to promote the decay before discharge of short-lived gaseous phase fission products included in the released gases.

2. A fuel element according to claim 1, wherein the vent path defining means defines a path including changes of direction.

3. A fuel element according to claim 1, wherein the vent path defining means comprises tubing.

4. A fuel element according to claim 1, wherein the vent path defining means affords a mean transit time of at least 100 hours.

5. A fuel element according to claim 2 and further comprising means disposed at a point of directional change in the vent path to define a liquid sealed gas trap chamber.

6. A fuel element according to claim 2 and further comprising means disposed at a point of directional change in the vent path to define a liquid sealed gas trap chamber.

7. A fuel element according to claim 5, wherein the liquid of the gas trap chamber is sodium.

8. A fuel element according to claim 3, wherein the tubing is a length of capillary tube.

9. For a nuclear reactor, an assembly of fuel elements of the vented type having a plurality of fuel-containing protective sheaths of elongated form arranged in parallel relationship, said assembly having a coolant inlet end and a coolant outlet end and comprising means defining a vent path terminating adjacent the coolant outlet end of the assembly in an outlet in open communication with the exterior surroundings of said sheaths for discharge into these surroundings of gases released by the fuel in the sheaths during operation of the assembly, and means connecting the end of said vent path defining means remote from said outlet to the fuel-containing interior spaces of the sheaths of said elements at points adjacent the coolant inlet end of said assembly.

10. An assembly of fuel elements according to claim 9, wherein said vent path defining means comprises a tube and the fuel elements are grouped according to a lattice configuration in which said tube occupies one position in place of a fuel element.

11. An assembly of fuel elements according to claim 9, wherein said elements are carried within an open-ended casing having a hollow wall section, the fuel-containing interior spaces of the elements being connected to the interior of the hollow wall section by passages in support means by which the elements are carried in the casing and the end of said vent path defining means remote from said outlet being connected to the interior of the hollow wall section.

12. An assembly of fuel elements according to claim 11, wherein a partition divides the interior of the hollow wall section into juxtaposed spaces between which communication is only possible around a lower free edge of the partition and wherein a liquid is disposed in said interior to immerse the free edge and so form a liquid sealed gas trap of the dip seal type, the said end of the vent path defining means and the passages of said support means being in communication respectively with said juxtaposed spaces whereby said liquid acts as a gas diffusion barrier.

References Cited

UNITED STATES PATENTS 3,238,105   3/1966   McNally _____ 176—37

CARL D. QUARFORTH, *Primary Examiner.*

BENJAMIN R. PADGETT, *Examiner.*

A. J. STEINER, *Assistant Examiner.*